United States Patent [19]

Janeway, III

[11] 4,251,837
[45] Feb. 17, 1981

[54] THREE DECISION THRESHOLDING MODE SWITCH AND METHOD FOR MODE SELECTION

[75] Inventor: Donald L. Janeway, III, Boulder County, Colo.

[73] Assignee: International Business Machines Corporation, Armonk, N.Y.

[21] Appl. No.: 85,355

[22] Filed: Oct. 16, 1979

Related U.S. Application Data

[63] Continuation-in-part of Ser. No. 939,542, Sep. 5, 1978.

[51] Int. Cl.³ .................................................. H04N 1/40
[52] U.S. Cl. ...................... 358/280; 340/146.3 AG; 358/282; 358/283; 358/284
[58] Field of Search ............... 358/280, 282, 283, 284; 340/146.3 AG

[56] References Cited
U.S. PATENT DOCUMENTS

| | | | |
|---|---|---|---|
| 2,255,408 | 9/1941 | Carlisle | 358/281 |
| 3,159,815 | 12/1964 | Groce | 340/146.3 R |
| 3,294,896 | 12/1966 | Young | 358/283 |
| 3,479,642 | 11/1969 | Bartz | 340/146.3 R |
| 3,534,334 | 10/1970 | Bartz | 340/146.3 R |
| 3,622,698 | 11/1971 | Richeson | 358/280 |
| 3,723,649 | 3/1973 | Pitegoff | 358/280 |
| 3,737,855 | 6/1973 | Cutaia | 340/146.3 AC |
| 3,830,967 | 8/1974 | Long | 358/283 |
| 4,047,152 | 9/1977 | Giuliano | 340/146.3 AG |
| 4,119,947 | 10/1978 | Leighton | 340/146.3 AG |

Primary Examiner—Howard W. Britton
Attorney, Agent, or Firm—O'Rourke & Harris

[57] ABSTRACT

A method for three decision mode selection of a thresholding algorithm is disclosed as is a thresholding mode switch having a three decision mode determining capability that is particularly useful for facsimile-copier devices in making printed copies of mixed format documents. The thresholding mode switch uses a reflectance difference algorithm for switching between a gray-scale thresholding algorithm and black-white thresholding algorithm to enhance the quality of prints made of mixed format documents presented for copying. A gradient constant is established for each picture element (pel) of the document then presented for copying and a determination is made at the thresholding mode switch as to which range, of three predetermined ranges, the gradient constant falls within, with this determination being then used to control the thresholding algorithm utilized in making that portion of the copy relating to that particular pel then being copied.

24 Claims, 3 Drawing Figures

THREE DECISION THRESHOLDING MODE SWITCH AND METHOD FOR MODE SELECTION

RELATED APPLICATION

This application is a continuation-in-part of my co-pending United States Application, Ser. No. 939,542, filed Sept. 5, 1978.

This invention relates to a thresholding mode switch and method for mode selection, and, more particularly, relates to a three decision thresholding mode switch and method for mode selection to control copying of mixed format documents.

BACKGROUND OF THE INVENTION

Devices and methods for copying of documents are well known in the prior art. Included in such prior art are devices and methods for enhancing the optical recognition of characters in documents being copied, and such character recognition devices have commonly included threshold circuitry. Such devices and method are shown, for example, in U.S. Pat. Nos. 3,479,642, 3,534,334 and 3,737,855.

It is also well known in the prior art to provide switching between different modes in a facsimile system, and this is shown, for example, in U.S. Pat. Nos. 3,294,896, 3,622,698 and 3,723,649.

In connection with facsimile systems, it has also been heretofore suggested that switching can be accomplished between two conditions depending upon whether the portions of a particular document then being copied consists of half-tones or black-and-white matter. A two condition thresholding arrangement is shown, for example, in U.S. Pat. No. 2,255,408, with circuitry being disclosed for switching between line copy and continuous tone detection algorithms based upon the rate of change of reflectance from the portion of the document then being copied. It is also suggested in U.S. Pat. No. 2,255,408 that unnecessary switching can be avoided by averaging the area over which the gradient change is selected.

A multiple threshold detector system having three range decision circuitry is also shown in the prior art (see, for example, U.S. Pat. No. 3,723,649), but the circuitry such as shown in U.S. Pat. No. 3,723,649 necessarily includes hysteresis that is operative in the decision logic to provide a change in the binary signal level indicative of a threshold level opposite to that establishing the then existing binary level to accomplish the stated end.

Thus, while the prior art shows thresholding mode switching circuits and methods for mode selection, the circuits and methods described are either capable of switching only between two conditions or necessarily require the use of hysteresis where more than two decisions are required.

SUMMARY OF THE INVENTION

This invention provides an improved thresholding mode switch and method for mode selection having three decision thresholding determining capability without requiring the use of hysteresis, with gradient constants being established for use in determining the thresholding mode to be utilized for each picture element to be copied. A gradient constant is established for each pel of the documents being copied and the value of the gradient constant, with respect to three established ranges, determines the thresholding algorithm used for controlling printing of that portion of copies relating to that particular pel.

An object of the present invention is to provide an improved thresholding mode switch.

Another object of the present invention is to provide an improved thresholding mode switch for use in making printed copies of mixed format documents.

Another object of the present invention is to provide an improved thresholding mode switch having a three decision threshold determining capability.

Another object of the present invention is to provide an improved thresholding mode switch having a three decision thresholding determining capability for use in making high quality prints of mixed format documents.

Another object of the present invention is to provide a three decision thresholding mode switch for use in a facsimile-copier to enhance the quality of printed copies of mixed format documents.

Another object of the present invention is to provide an improved method for determining the optimum mode for copying of mixed format documents.

Still another object of the present invention is to provide an improved method for determining the optimum mode for copying of mixed format documents utilizing three decision determination.

BRIEF DESCRIPTION OF THE DRAWINGS

The above-mentioned and other features and objects of this invention and the manner of attaining them will become more apparent and the invention itself will best be understood by reference to the following description of embodiments of the invention taken in conjunction with the accompanying drawings, the description of which follows.

DESCRIPTION OF THE PREFERRED EMBODIMENT

Figure 1:
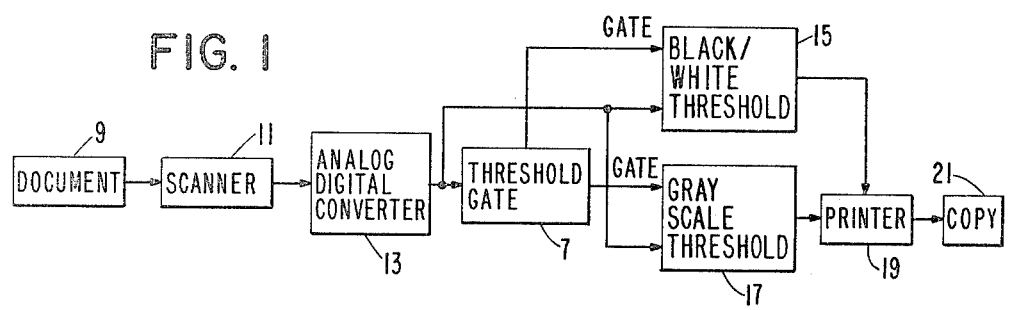
FIG. 1 is a block diagram illustrating data flow for copying mixed format documents utilizing the thresholding mode switch of this invention.

The thresholding mode switch 7 of this invention is shown in FIG. 1 included in a data flow chart (such as in a facsimile-copier) to illustrate use of the switch to determine and control the mode for printing of copies of mixed format documents.

As indicated in FIG. 1, a mixed format document 9 is scanned by scanner 11. Document 9 may, for example, include portions having continuous tone, gray-scale, and line copy. With respect to such documents, while much effort has heretofore been expended to optimize a gray-scale algorithm to achieve high quality copying of continuous tone, previously gray scaled, and line copy documents, an algorithm achieving quality copying of any one format has heretofore resulted in a poor copy of the other two formats. This is due, at least in part, to the difference in the rate of change of reflectance of continuous tone as compared to line copy. Line copy has sharp gradients of reflectance due to the characters being normally either dark or light, while continuous tones usually transition more slowly from darker to light regions and vice versa and hence have a much lower rate of change of reflectance than does line copy.

Scanner 11 is preferably a conventional image dissecting scanning device capable of individually scanning each picture element, or pel, and provides an analog electrical signal output that is converted at conventional analog-to-digital converter 13 to a digital output signal that is indicative of each pel processed by scanner 11.

As also indicated in FIG. 1, the digital output signal from analog-to-digital converter 13 is coupled to thresholding mode switch 7, the outputs of which control black-white thresholding algorithm circuitry 15 and gray-scale thresholding algorithm circuitry 17 which determine the mode of copying of information copied from converter 13 carried out for each pel at printer 19 to make copy 21.

Black-white thresholding algorithm circuitry 15 and gray-scale thresholding circuitry 17 may be conventional and may be, for example, circuitry such as shown in U.S. Pat. Nos. 3,159,815 or 3,830,967. Such circuitry is not involved in this invention, however, except to the extent that the thresholding mode switch of this invention controls the mode of copying carried out by printer 19, which printer may also be conventional.

Mode switch 7 utilizes an algorithm that instantaneously recognizes sharp gradients and treats them differently than areas having more gentle transitions. In accomplishing this end, the individual reflectance differences between adjacent picture elements, or pels, as determined by image-dissecting scanning device 11, are determined and the absolute value of these differences is summed over a predetermined number of pels. This sum is then normalized by dividing by the reflectance of the pel then being thresholded. The normalization may be modified by using some function of the pel or a combination of pels as the divisor. The result of this calculation is a constant, referred to hereinafter as the gradient constant, which indicates the rate of change of reflectance with linear displacement of the scanning point, or pel position. By averaging over a number of pels, noise sensitivity is reduced.

If the established gradient constant is large, this indicates that the rate of reflectance change is high, requiring that a black-white thresholding algorithm be used for achieving the best possible, or optimum, copy. If, on the other hand, the gradient constant is very small, this indicates that the area being scanned is essentially of constant reflectance and the thresholding mode being used previously to encounter this small constant is continued. If the gradient constant has an intermediate value, this indicates that slow changes in reflectance are occurring and a suitable gray-scale thresholding algorithm is appropriate for achieving the best possible, or optimum, copy.

Expressed mathematically, the switching algorithm is:

$$F_i = \frac{\sum_{j=i-a}^{j=i+b} |R_{j+1} - R_j|}{R_i}$$

where $F_i$ = gradient constant for the ith pel, i.e., the pel being thresholded;

$R_i$, $R_{j+1}$ and $R_j$ = reflectance of the i, j+1, and j pels, respectively; and a and b = arbitrary constants determined by the optimization of the algorithm to the particular application (the integer constants a and b are normally expected to range between minus two to plus five. The size and position of the window is defined by a and b where b > (−a), a being the number of pels behind i and b being the number of pels ahead of i.

If: $F_i > K_2$, then the thresholding mode is changed to the black-white thresholding algorithm;

$K_1 \leq F_i \leq K_2$, then the thresholding mode is changed to the gray-scale thresholding algorithm; or $F_i < K_1$, then no change is made in the thresholding mode where $K_1$ and $K_2$ are arbitrary constants determined by optimization of the algorithm to the particular application.

The constant $K_1$ is chosen high enough to prevent gray-scaling of the background of the text, while the constant $K_2$ is chosen low enough to respond to sharp transitions in non-text but high enough to soften contrasts. If $K_1$ is increased from optimum, there is quicker recognition of changes in format and an increased likelihood of not recognizing slow changes in continuous formats so as to remain in black-white too long. If $K_1$ is decreased away from optimum, there is an increased probability of applying a low density gray-scaling algorithm to backgrounds of text. If $K_2$ is increased away from optimum, there will be fuzziness in the copies of characters and gray-scaling of courser halftone screens. If $K_2$ is decreased away from optimum, the contrast increases in continuous tones and fine screen halftones.

Variations of the above expressed algorithm may include the extension to two dimensions to evaluate the gradient constant, and the use of density rather than reflectance to calculate the constant. Density is not directly available from most scanning devices, but if available can be used by applying the definition of density to the equation. Where utilized the density relationship is $D = \log 1/R$ or $R = 10^{-D}$.

Figure 2:
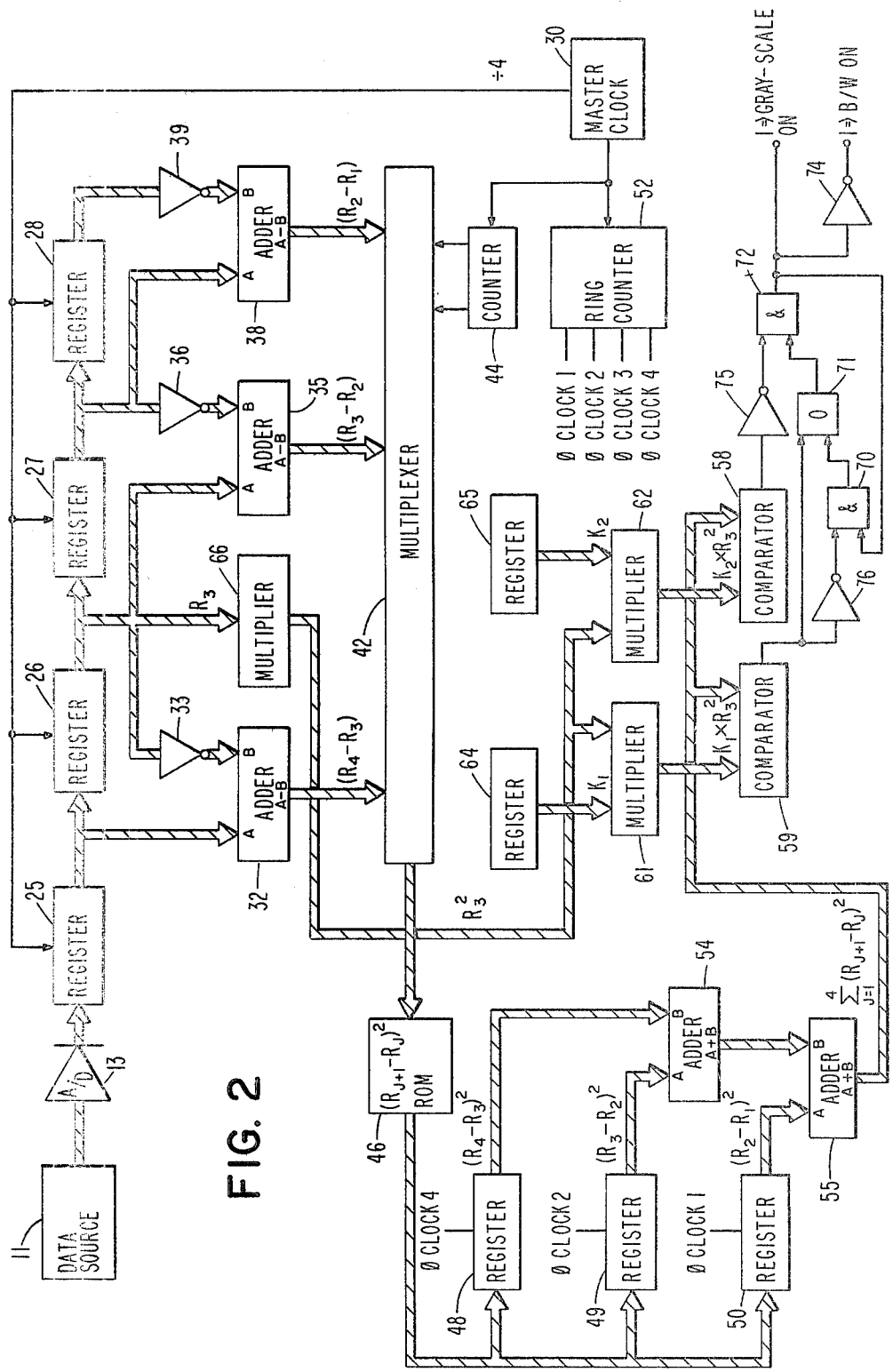
FIG. 2 is a block diagram illustrating a particular thresholding mode switch that can be utilized as the thresholding mode switch shown in the block diagram of FIG. 1.

A specific implementation of thresholding mode switch circuit 7 is illustrated in FIG. 2, where the circuit operates according to the algorithm above set forth except that the numerator and denominator have been squared as opposed to computing absolute values. The switching algorithm for this specific implementation is expressed mathematically as:

$$F_i = \frac{\sum_{j=i-a}^{j=i+b} (R_{j+1} - R_j)^2}{R_i^2}$$

Where $F_i$, $R_i$, $R_{j+1}$, $R_j$ and a and b have the same meaning as the above expressed algorithm with the aritrary selection of a and b having been made as one and two, respectively. In other words, in the actual example as shown in FIG. 2, there are two pels ahead of i and one pel behind i.

As shown in FIG. 2, the analog data coupled from scanner 11 and converted to digital form in analog-to-digital converter 13, is coupled to four bit registers 25, 26, 27 and 28, which registers also receive an input from master clock 30 (divided by four). Four consecutive data bytes ($R_1$, $R_2$, $R_3$ and $R_4$) are loaded into the registers 25–28 from converter 13. Each byte is cascaded through the registers as each new data byte is shifted into the circuit.

As shown in FIG. 2, register 25 is directly connected with adder 32, register 26 is connected with adder 32 through inverter 33 and is directly connected with adder 35, register 27 is connected with adder 35 through inverter 36 and is directly connected with adder 38, and register 28 is connected with adder 38 through inverter 39. As shown, the data ($R_1$, $R_2$, $R_3$ and $R_4$ in registers 28, 27, 26, and 25, respectively) is transferred to the adders where the quantities $R_{j+1} - R_j$ are calculated.

Adders 32, 35, and 38 are connected with multiplexer 42 which receives the difference outputs $R_2-R_1$, $R_3-R_2$, and $R_4-R_3$ from the adders, 38, 35, and 32, respectively. Multiplexer 42 (which is connected with counter 44, which counter is also connected with master clock 30) provides an output to read only memory (ROM) 46 so that the quantities calculated at the adder are channeled through ROM 46. ROM 46 returns the square of the difference $(R_{j+1} - R_j)^2$ using a table-look-up scheme. This scheme is one in which the input to the ROMs is an address corresponding to a particular value stored in the ROM, i.e., if the input is a 6 (i.e., storage position 6) the output from ROM 46 would be the value 36 or $6^2$. This scheme is faster in this case than the circuitry required for calculation of squares. These squared differences are then transferred to registers 48, 49 and 50, each of which registers is connected with ring counter 52, and then summed in adders 54 and 55 with the sum $$\sum_{j=1}^{4} (R_{j+1} - R_j)^2$$

being carried to digital comparators 58 and 59, (i=3, i−a=3−2=1, and i+b=3+1=4 for the specific embodiment shown in FIG. 2). As shown, the outputs of register 48 $(R_4 - R_3)^2$ and register 49 $(R_3 - R_2)^2$ are coupled to adder 54 while the result thereof and the output of register 50 $(R_2 - R_1)^2$ are coupled to adder 55.

The second input to comparator 58 and 59 is coupled thereto from multipliers 61 and 62 with multiplier 61 receiving a $K_1$ input from register 64 and multiplier 62 receiving a $K_2$ input from register 65. The $R_3^2$ input is coupled from register 26 through multiplier 66 to multipliers 61 and 62. The values $K_1 \times R_3^2$ and $K_2 \times R_3^2$ are calculated in multipliers 61 and 62, respectively, and coupled to comparators 59 and 58, respectively.

The logic states of the outputs of comparators 58 and 59 establish the three decision states according to the following table:

| Condition | State No. | Comparator Output Level 58 | 59 |
|---|---|---|---|
| $\dfrac{\sum_{j=1}^{4} (R_{j+1} - R_j)^2}{R_3^2} < K_1$ | 1 | 0 | 0 |
| $K_1 \leq \dfrac{\sum_{j=1}^{4} (R_{j+1} - R_j)^2}{R_3^2} \leq K_2$ | 2 | 0 | 1 |
| $\dfrac{\sum_{j=1}^{4} (R_{j+1} - R_j)^2}{R_3^2} > K_2$ | 3 | 1 | 1 |

These logic states are interpreted into switching signals for the black-white and gray-scale thresholding circuitry by logic gates 70, 71 and 72 (gates 70 and 72 being AND gates and gate 71 being an OR gate), and by the inverters 75 and 76. State 1 results in the output of AND gate 72 remaining at its previous level and thereby maintaining the previous threshold mode. State 2 results in the output of AND gate 72 being 1 thereby employing gray-scale thresholding. State 3 results in AND gate 72 being 0 thereby employing black-white thresholding, the output being coupled through inverter 74.

Figure 3:
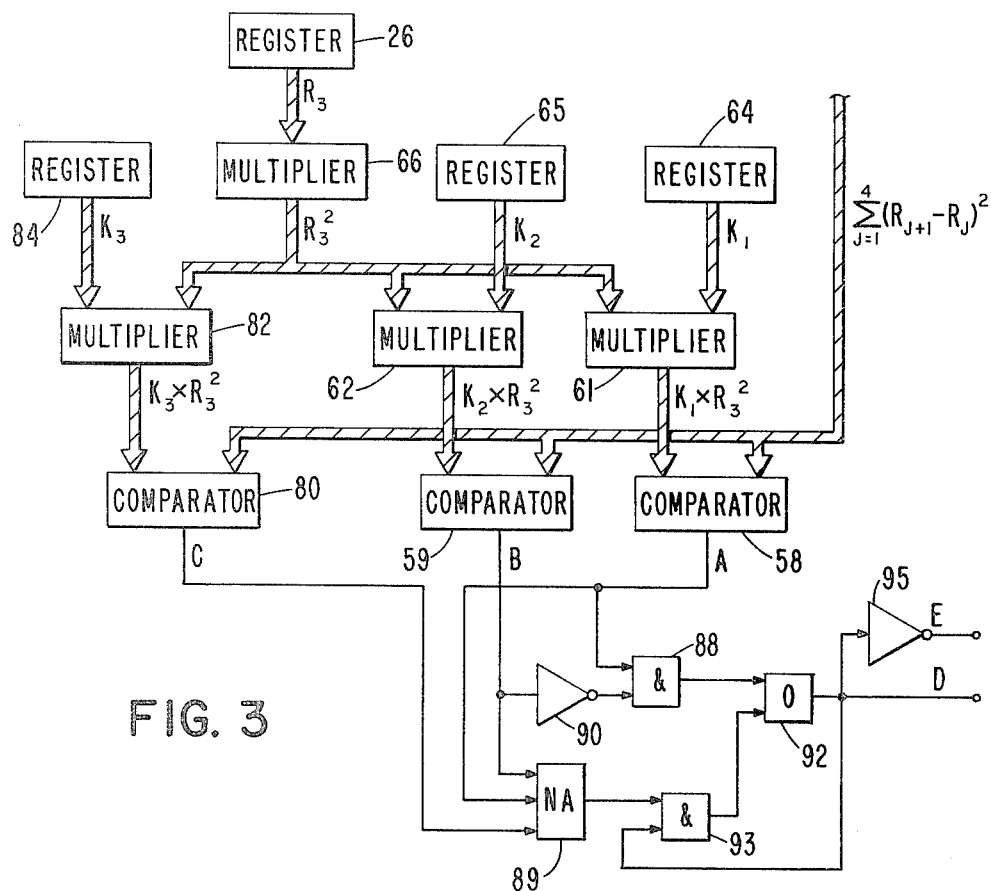
FIG. 3 is a block diagram illustrating an alternate embodiment of the invention.

An alternate embodiment of the thresholding mode switch of this invention is shown in FIG. 3 to include three comparators 58, 59, and 80. As shown, comparators 58 and 59 receive inputs from adder 55 and multipliers 61 and 62 in the same manner as described in connection with the FIG. 2 embodiment. In this embodiment (FIG. 3), comparator 80 receives inputs from adder 55 and multiplier 82. Multiplier 82 receives an input ($R_3^2$) from register 26 through multiplier 66 and a $K_3$ input from register 84. $K_3$ is a constant to add a hysteresis effect. The purpose of such hysteresis is to minimize the number of threshold mode changes that occur.

The outputs from comparators 58, 59, and 80 are as follows:

$$A \longleftrightarrow \left[ \sum_{j=1}^{4} (R_{j+1} - R_j)^2 \right] < K_1 \times R_3^2$$

$$B \longleftrightarrow \left[ \sum_{j=1}^{4} (R_{j+1} - R_j)^2 \right] < K_2 \times R_3^2$$

$$C \longleftrightarrow \left[ \sum_{j=1}^{4} (R_{j+1} - R_j)^2 \right] < K_3 \times R_3^2$$

The output from comparator 58 (designated A) is coupled to AND gate 88 and NAND gate 89, the output from comparator 59 (designated B) is coupled to AND gate 88 (through inverter 90) and to NAND gate 89, and the output from comparator 80 (designated C) is coupled to NAND gate 89. The output from AND gate 88 is coupled to OR gate 92, while the output of NAND gate 89 is coupled to OR gate 92 through AND gate 93 (which receives a second input from OR gate 92).

The output from OR gate 92 is coupled to the gray-scale thresholding circuitry and the black-white thresholding circuitry to control operation thereof with the output designated D controlling gray-scale thresholding and the output designated E being coupled through inverter 95 to control black-white thresholding according to the following:

$$D \longleftrightarrow \text{gray-scale ON}$$
$$\text{when } D = AB + (\overline{ABC})D$$

$$E \longleftrightarrow \text{black-white ON}$$
$$\text{when } E = \overline{D}$$

The logic circuitry acts to achieve the following states:

| Condition | State No. | Comparator Level 58 | 59 | 80 |
|---|---|---|---|---|
| $F_i < K_1$ | 1 | 0 | 0 | 0 |

| | State | Comparator Level | | |
|---|---|---|---|---|
| Condition | No. | 58 | 59 | 80 |
| $K_1 \leqq F_i < K_2$ | 2 | 1 | 0 | 0 |
| $K_2 \leqq F_i < K_3$ | 3 | 1 | 1 | 0 |
| $K_3 \leqq F_i$ | 4 | 1 | 1 | 1 |

State 1 results in no change in the switch condition. State 2 results in gray-scale thresholding. State 3 results in no change in switch condition, and State 4 results in black-white thresholding.

In view of the foregoing, it should be appreciated that this invention provides an improved thresholding mode switch and method for mode selection that are useful in achieving high quality printed copies of mixed format documents.

What is claimed is:

1. A thresholding mode switching device for establishing an optimum operational mode for printing copies of mixed format documents, said mode switching device comprising:

pel processing means for receiving a plurality of pels indicative of portions of documents then being copied and developing therefrom an output indicative of a rate of change of reflectance between pels in said plurality of pels;

range establishing means connected with said pel processing means to receive the output therefrom and establishing at least three ranges each reflecting different rates of reflectance changes possible between said pel then being thresholding and said other pels of said plurality of pels and providing an output indicative thereof; and selecting means for receiving said output from said range establishing means and responsive thereto selecting one of three decisions as established by said range establishing means to provide a mode establishing output that enables selection of an optimum operational mode with respect to said pel then being thresholded.

2. The mode switching device of claim 1 wherein said device is utilized in a system that includes a document scanner providing an analog output signal indicative of the reflectance sensed from said document for each portion then to be copied, and an analog-to-digital converter for converting said analog signal to a digital output signal with said digital output signal being coupled to said pel processing means.

3. The mode switching device of claim 2 wherein said mixed format documents may include continuous tone, previously gray-scaled, and line copy documents.

4. The mode switching device of claim 2 wherein said system is a facsimile-copier system.

5. The mode switching device of claim 1 wherein said range establishing means includes gradient constant establishing means for establishing a gradient constant which reflects the reflectance rate of change of said pel then being thresholded with respect to the reflectances of said other pels of said received plurality of pels.

6. The mode switching device of claim 5 wherein said gradient constant establishing means includes determining means for receiving said pels and determining the differences between each received pel and an immediately adjacent pel included in said plurality of pels, summing means connected with said difference determining means for summing absolute values of the differences determined by said determining means, and dividing means connected with said summing means to normalize the values summed by said summing means by dividing the same by the value of the pel then being thresholded.

7. The mode switching device of claim 5 wherein said gradient establishing means includes a first plurality of cascaded registers for receiving said plurality of pels, a first plurality of adders for receiving the outputs from said registers and providing difference outputs, a read only memory circuit which returns the square of differences coupled thereto, a multiplexer to channel the differences from said adders through said read only memory circuit, a second plurality of registers connected with said read only memory circuit to receive the squared difference outputs therefrom, a second plurality of adders for summing the squared differences received from said second set of registers, a plurality of multipliers to produce a value indicative of said pel then being thresholded, and comparator means for receiving joint outputs from said second plurality of adders and said plurality of multipliers.

8. The mode switching device of claim 7 wherein said gradient establishing means includes a plurality of gates connected with said comparator means.

9. The mode switching device of claim 8 wherein said comparator means includes first and second comparators, and wherein said gates include first and second AND gates and an OR gate, said first AND gate being connected with said first comparator to receive an inverted output therefrom and to said OR gate to receive outputs therefrom, said second AND gate being connected to said second comparator to receive an inverted output therefrom and to said first AND gate to receive outputs therefrom, and said OR gate being connected to said second comparator and said second AND gate to receive outputs therefrom.

10. The mode switching device of claim 8 wherein said comparator means includes first, second and third comparators, and wherein said gates include an OR gate, first and second AND gates, a NAND gate and an inverter, said OR gate being connected with said AND gates to receive the outputs therefrom, said first AND gate being connected with said first comparator and through said inverter with said second comparator to receive outputs therefrom, said second AND gate being connected with said NAND gate and said OR gate to receive outputs therefrom, and said NAND gate being connected to said first, second and third comparators to receive outputs therefrom.

11. The mode switching device of claim 7 wherein said plurality of multipliers includes first and second multipliers, and wherein said comparator means includes first and second comparators each of which is connected with a different one of said multipliers.

12. The mode switching device of claim 7 wherein said plurality of multipliers includes first, second and third multipliers, and wherein said comparator means includes first, second and third comparators, each of which is connected with a different one of said multipliers.

13. A three decision thresholding mode switching device for establishing an optimum operational mode from at least two available mode control algorithms for printing copies of mixed format documents in a system that includes a scanner for scanning the reflectance from that portion of the document then being copied to develop therefrom an analog output signal indicative thereof, and an analog-to-digital converter to convert the developed analog signal to a digital output signal that includes a plurality of pels, said mode switching device comprising:

gradient constant establishing means for receiving said plurality of pels indicative of the reflectance sensed by said scanner and developing therefrom a gradient constant for each pel when thresholded, said gradient constant being indicative of the rate of change of reflectance of said pel then being thresholded with respect to the average rate of change of predetermined others of said plurality of pels, said gradient constant establishing means including means for establishing three different decision ranges of gradient constants and providing outputs indicative thereof; and selecting means for receiving said gradient constants from said gradient constant establishing means and responsive thereto providing a mode control output for establishing said optimum operational mode for printing that portion of the copy of said document then being scanned.

14. The mode switching device of claim 13 wherein said available mode control algorithms include a black-white thresholding algorithm and a gray-scale thresholding algorithm, and wherein said three decision ranges established by said range establishing means provide for utilization of said black-white thresholding algorithm when said gradient constant is large, utilization of said gray-scale thresholding algorithm when said gradient constant is intermediate, and continuation of the previously utilized thresholding algorithm when the gradient constant is small.

15. The mode switching device of claim 14 wherein the switching algorithm for decision determination is:

$$F_i = \frac{\sum_{i=i-a}^{j=i+b} |R_{j+1} - R_j|}{R_i}$$

where, $F_i$ = gradient constant for the ith pel (i.e., the pel being thresholded);

$R_i$, $R_{j+1}$ and $R_j$ = reflectance of the i, j+1, and j pels, respectively; and a and b = arbitrary constants determined by the optimization of the algorithm to the particular application so that when:

$F_i > K_2$, then the thresholding mode is changed to said black-white thresholding algorithm;

$K_1 \leq F_i \leq K_2$, then the thresholding mode is changed to said gray-scale thresholding algorithm; and $F_i > K_1$, then no change is made in the thresholding mode.

16. An electronic switching device for establishing the optimum operational mode with respect to a predetermined parameter of data from a plurality of available modes in a processing unit receiving said data in the form of a plurality of bytes indicative of a portion of said data, said device comprising:

first means for receiving a plurality of bytes representing said received data and developing therefrom an output signal indicative of differences with respect to said predetermined parameter of said data between one of said received bytes and others of said bytes of said received plurality of bytes;

second means connected with said first means and for establishing at least three ranges into which said differences sensed by said first means can fall and providing output signals indicative thereof; and third means for receiving said output signals from said second means and responsive thereto selecting one of three decisions as established by said second means to provide mode establishing signals that enable selection of the optimum operational mode for said processing unit.

17. The electronic switching device of claim 16 wherein said processing unit is a printer-copier for mixed format documents which includes an image dissecting scanner providing an analog signal indicative of reflectance from the portion of the document then being scanned, an analog-to-digital converter for providing a digital output signal having a plurality of bytes, a printer, and at least two control algorithms for causing printing in different modes, and wherein said mode establishing output signals from said third means of said electronic switching device controls said control algorithms to optimize printing of copies by said printer with respect to the portion of the document then being scanned.

18. The electronic scanning device of claim 17 wherein said electronic switching device causes one of said control means to be operative in the event of a first decision by said switching means, causes the other of said control algorithms to be operative in the event of a second decision, and causes operation of the last utilized control algorithm in the event of a third decision.

19. The electronic switching device of claim 18 wherein said byte differences reflect rate of change of reflectance differences with a large rate of change causing said first decision, an immediate rate of change causing said second decision, and a small change causing said third decision.

20. A method for establishing an optimum operational mode for printing copies of mixed format documents by selection of a thresholding algorithm, from a plurality of algorithms, most suitable for each scanned segment of the document, said method comprising:

scanning a document and producing a plurality of pels indicative of reflectance from different segments of the scanned document;

developing an output indicative of the rate of change of reflectance of the pel from which a thresholding algorithm is then to be selected with respect to other pels of said plurality of pels;

determining the value of said developed output with respect to the value ranges of at least three different rates of change of reflectance ranges; and utilizing said determination to cause the most suitable thresholding algorithm to be utilized to print copies of that portion of the document then being scanned.

21. The method of claim 20 wherein a gradient constant is developed from said rate of change of reflectance, and wherein said gradient constant determines said thresholding algorithm to be utilized.

22. The method of claim 21 wherein said thresholding algorithm includes two different thresholding algorithms, and wherein a first decision is reached if said gradient constant is large to cause utilization of one of said thresholding algorithms, a second decision is reached if said gradient constant is intermediate to cause utilization of the other of said thresholding algorithms, and a third decision is reached if said gradient constant is small to cause utilization of the last utilized thresholding algorithm.

23. The method of claim 22 wherein said one thresholding algorithm is a black-white thresholding algorithm, and therein said other thresholding algorithm is a gray-scale thresholding algorithm.

24. A method for establishing an optimum operational mode for printing copies of mixed format documents by selection of one of a black-white thresholding algorithm and a gray-scale thresholding algorithm for each segment of the scanning document, said method comprising:

scanning a document and producing a plurality of pels indicative of the reflectance as sensed from different segments of the document during scanning;

determining the reflectance differences between adjacent pels of said plurality of pels and summing the determined differences;

normalizing the summed differences by dividing the summed differences by the reflectance value of the pel for which a thresholding algorithm is then to be selected to establish a gradient constant with respect to said pel;

selecting three ranges of gradient constants corresponding to three decisions one of which is to utilize said black-white thresholding algorithm, the second of which is to utilize said gray-scale thresholding algorithm, and the third of which is to utilize the last utilized thresholding algorithm;

determining into which of the said three ranges said established gradient constant falls; and utilizing said determination to select the thresholding algorithm best suited for printing copies of that segment of the document then being scanned.

* * * * *

UNITED STATES PATENT AND TRADEMARK OFFICE
CERTIFICATE OF CORRECTION

PATENT NO. : 4,251,837
DATED : February 17, 1981
INVENTOR(S) : Donald L. Janeway, III It is certified that error appears in the above-identified patent and that said Letters Patent are hereby corrected as shown below:

Column 7, Line 31, "thresholding" should read --thresholded--.
Column 9, Line 53, "$F_i > K_1$" should read --$F_i < K_1$--.

Signed and Sealed this

Twenty-fourth Day of November 1981

[SEAL]

Attest:

GERALD J. MOSSINGHOFF

Attesting Officer      Commissioner of Patents and Trademarks